AUTOMOBILE SPEED CONTROL

Original Filed May 17, 1966 3 Sheets-Sheet 1

RALPH W. CARP
CYRUS M. GRANGER
PETER ST. C. MANSON
MICHAEL SLAVIN
INVENTORS

BY Killman & Lamb
ATTORNEYS

AUTOMOBILE SPEED CONTROL

Original Filed May 17, 1966 3 Sheets-Sheet 2

RALPH W. CARP
CYRUS M. GRANGER
PETER ST. C. MANSOM
MICHAEL SLAVIN
INVENTORS

BY Killman & Lamb
ATTORNEYS

AUTOMOBILE SPEED CONTROL

Original Filed May 17, 1966 3 Sheets-Sheet 3

RALPH W. CARP
CYRUS M. GRANGER
PETER ST.C. MANSON
MICHAEL SLAVIN
INVENTORS

BY Killman & Lamb
ATTORNEYS

United States Patent Office

Re. 27,324
Reissued Mar. 28, 1972

27,324
AUTOMOBILE SPEED CONTROL

Cyrus M. Granger, Green Bay, Wis., Michael Slavin, Towson, and Ralph W. Carp, Baltimore, Md., and Peter St. C. Manson, Barrington, Ill., assignors to The Bendix Corporation, Baltimore, Md.

Original No. 3,381,771, dated May 7, 1968, Ser. No. 550,744, May 17, 1966. Application for reissue May 6, 1970, Ser. No. 34,951
Int. Cl. B60k *31/00*
U.S. Cl. 180—105 11 Claims

Matter enclosed in heavy brackets [ ] appears in the original patent but forms no part of this reissue specification; matter printed in italics indicates the additions made by reissue.

*ABSTRACT OF THE DISCLOSURE*

*A control amplifier combines a first electrical signal corresponding to desired automobile speed, a second electrical signal corresponding to actual automobile speed and a third electrical signal corresponding to throttle position so as to generate an error signal. The error signal is applied to a vacuum modulator which in response thereto provides to a vacuum motor a vacuum pressure related to the error signal. The vacuum motor is mechanically ganged to the throttle and controls throttle position.*

The present invention relates to improvements in speed control systems for automotive vehicles.

Speed controls for automobiles are now in commercial use. Their purpose is to maintain the speed of an automobile constant at a preselected value despite varying engine loads imposed by the road or the wind. Of course, hazards arise in travel which prevent the maintenance of constant speed. The control must then instantly disengage upon signal from the operator to revert the engine to manual control. Upon the way being clear, the control, on direction from the operator, again regulates the speed at the desired value.

Many variations in the manner in which commands are given to the control and in the means for accomplishing control are described in the art. Further, the accomplishments of feedback controls in the fields of guided missiles, space vehicles, aircraft, machine tools and others are sufficiently great that the regulation of automobile speed presents no problems not readily solved, provided that the designer is not limited as to the costs and complexity of the system.

Problems arise, however, when the control is to be mass produced at a cost modest enough to encourage its wide scale adoption. These factors assert that a successful control shall be simple in concept and execution and that rigid tolerances, individual tailoring of characteristics and other time and expense consuming operations be abolished.

One object of the present invention is to provide a speed control in which the mechanical elements are reduced to a minimum and in which the remaining mechanical elements are of the utmost simplicity. The costs of manufacture are then materially reduced since close mechanical tolerances are avoided. The critical functions of the control are to be accomplished in electronic feedback circuits which generally are capable of better performance at equal or lower production costs then equivalent mechanical means.

The safety aspects of a speed control are not to be ignored. While it is an object of the invention to produce a control of improved accuracy and stability at a reduced cost, it is a further object to insure that these advantages are attained without sacrifice in safety. The safety criteria foremost in guiding the development of the invention include the principles that the system be fail-safe, that the system shall not assume control without deliberate direction of the operator, that reaction to a road hazard by application of the brakes shall cancel control by the system and that the operator shall be free to accelerate beyond the control speed, should the occasion demand.

Briefly, the invention comprises a speed control system in which the engine throttle is positioned by a vacuum powered electrically controlled servomotor. An electrical input representing the command speed selected by the operator is compared with electrical feedback signals representing the vehicle speed and the throttle position to produce an error signal. The amplified error signal controls the vacuum applied to a vacuum actuator linked to the engine throttle thus completing the servo loops. A deficiency in road speed causes the error signal and vacuum to be such that the throttle is further opened and more power is supplied to the vehicle. An excess of road speed reverses events, causing the throttle opening to be reduced and less power to be supplied to the vehicle.

Figure 1:
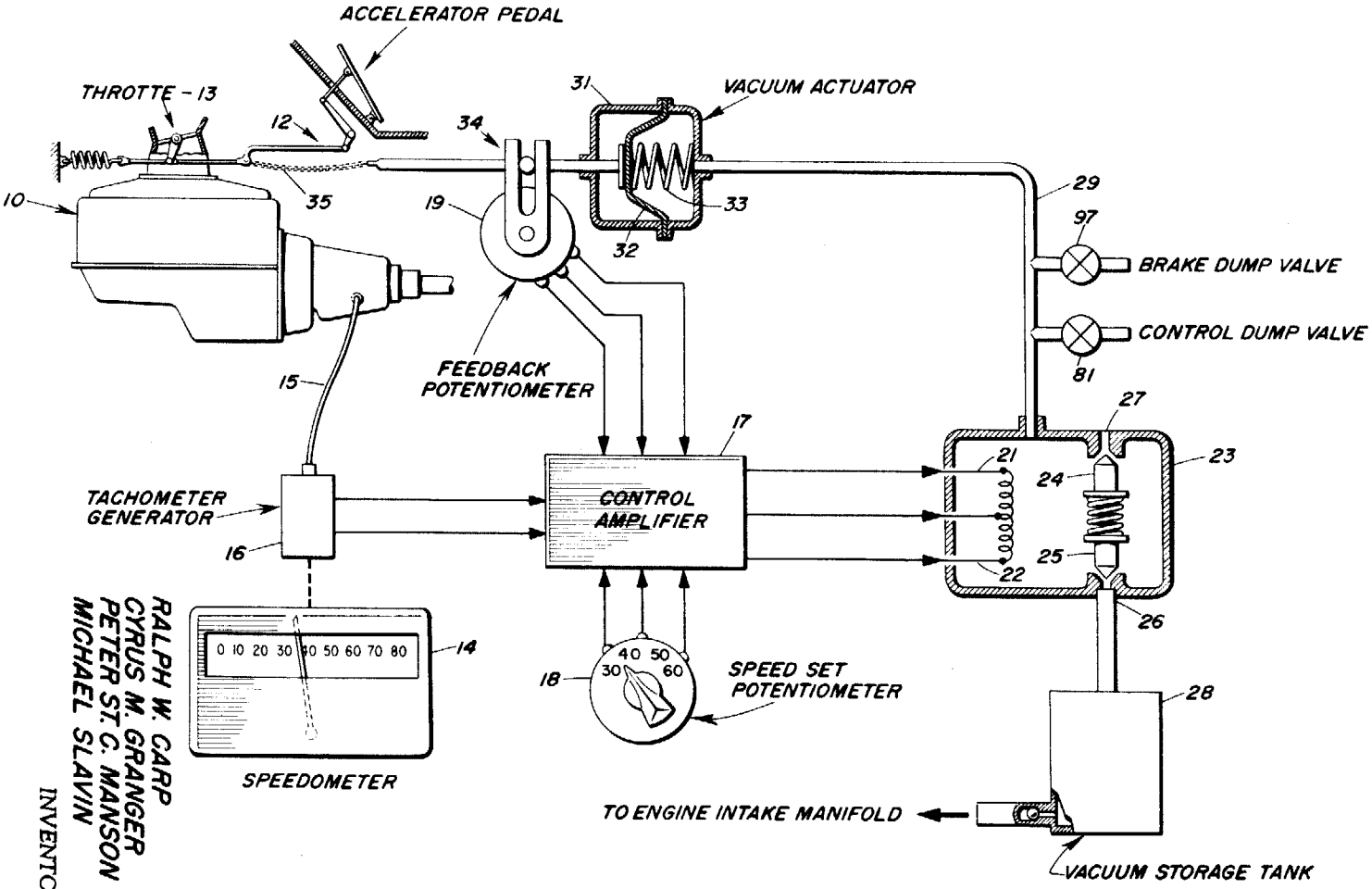
FIG. 1 is a pictorial functional diagram of the speed control of the invention.

FIG. 1 illustrates the speed control system of the invention. The power output of the engine 10 and the vehicle speed is manually controlled by an accelerator pedal and linkage 12 to the throttle valve 13. The vehicle speed is indicated by a speedometer 14 which is coupled to the transmission output by a flexible shaft 15. A tachometer generator 16 is inserted in line with the speedometer 14 and shaft 15 to be driven at the same speed as the speedometer. Since the gear ratios between the transmission output and the vehicle drive wheel is fixed, the rotational speed of shaft 15 is proportional to the road speed of the vehicle, assuming no slippage of the drive wheel. The output of generator 16 is therefore an electrical signal directly proportional to vehicle speed. This signal serves as a feedback signal to a control amplifier 17. The command signal to control amplifier 17 is supplied by a potentiometer calibrated in terms of the desired vehicle speed. A feedback potentiometer 19 supplies a throttle position feedback signal. The signals from the generator 16 and potentiometer 19 are subtracted from the signal from potentiometer 18 to form the system error signal. Control amplifier 17 includes a differentially connected output stage which drives the windings 21 and 22 of a vacuum modulator valve 23 in push-pull fashion. The modulator valve 23 is described in detail in U.S. Patent No. 3,315,-730. Briefly, the valve includes opposed needle valves 24 and 25 which are positioned reciprocally against ports 26 and 27 either to admit through port 27 atmospheric pressure to the interior of valve 23 or to reduce the interior pressure of valve 23 by opening valve 25 which communicates through port 26 to a source 28 maintained at sub-atmospheric pressure by the engine intake manifold vacuum. The operation of valve 24 or 25 depends upon the sense of the error signal in windings 21 and 22. The modulator valve 23 is connected by conduit 29 to a vacuum actuator 31. The actuator 31 includes a flexible diaphragm 32 which divides the interior into two compartments, one of which is exposed to atmospheric pressure and the other of which is at a sub-atmospheric pressure determined by the modulator valve 23. A compression spring 33 contained by the sub-atmospheric compartment tends to expand that chamber while the greater pressure of the atmospheric compartment works against the spring force, displacing the actuator rod to the point where the pressure difference balances the spring force. The actuator rod is coupled through a linkage 34 to feedback potentiometer 19 and through a bead chain or similar flexible linkage to the engine throttle. In the preferred embodiment of the invention, the linkage 34 is purposely made nonlinear to compensate for variations in engine performance. As will appear more fully hereinafter, a non-linear linkage may not be essential in certain installations.

The operation of the system is typically that of a closed loop servo-mechanism. If the vehicle road speed is less than the command speed to which potentiometer 18 is set, the error signal will be of proper sense to cause needle valve 25 to open. Valve 25 opens in proportion to the magnitude of the error to cause the pressure within the modulator valve 23 to be reduced. The reduced pressure of valve 23 causes the sub-atmospheric chamber of actuator 31 to be reduced in volume, displacing the actuator rod in the direction of increased throttle opening. If the road speed of the vehicle is greater than the command speed, the sense of the error signal is opposite that of the first instance, causing valve 24 to be opened and valve 25 to be closed. The pressure within the modulator valve is increased and the displacement of the actuator rod is in the direction of reduced engine throttle. Whenever the vehicle speed and command speed are equal, the pressure within modulator valve 23, and hence the position of the throttle is static.

Figure 2:
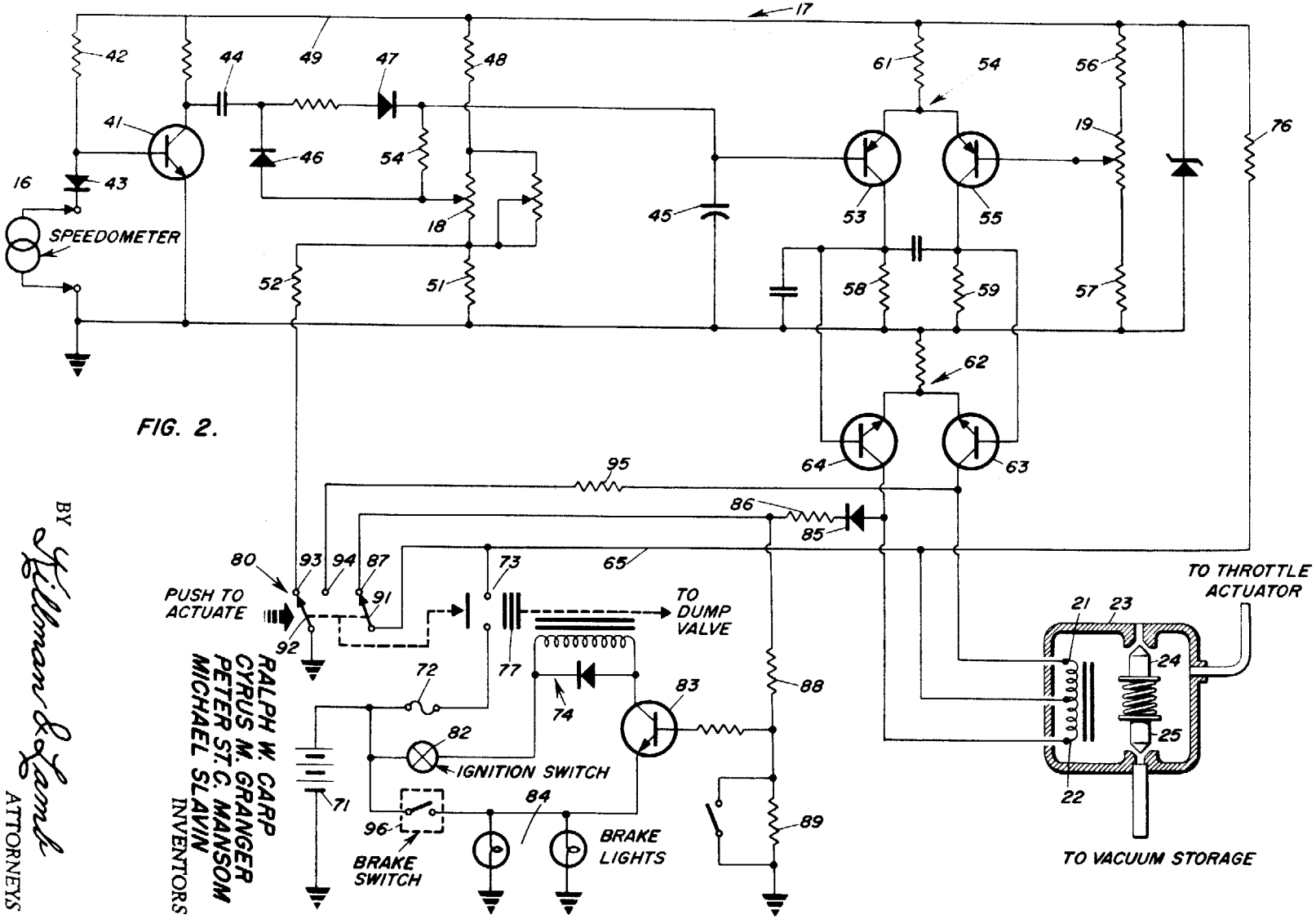
FIG. 2 is a schematic diagram of the control amplifier shown in block form in FIG. 1.
Figure 3:
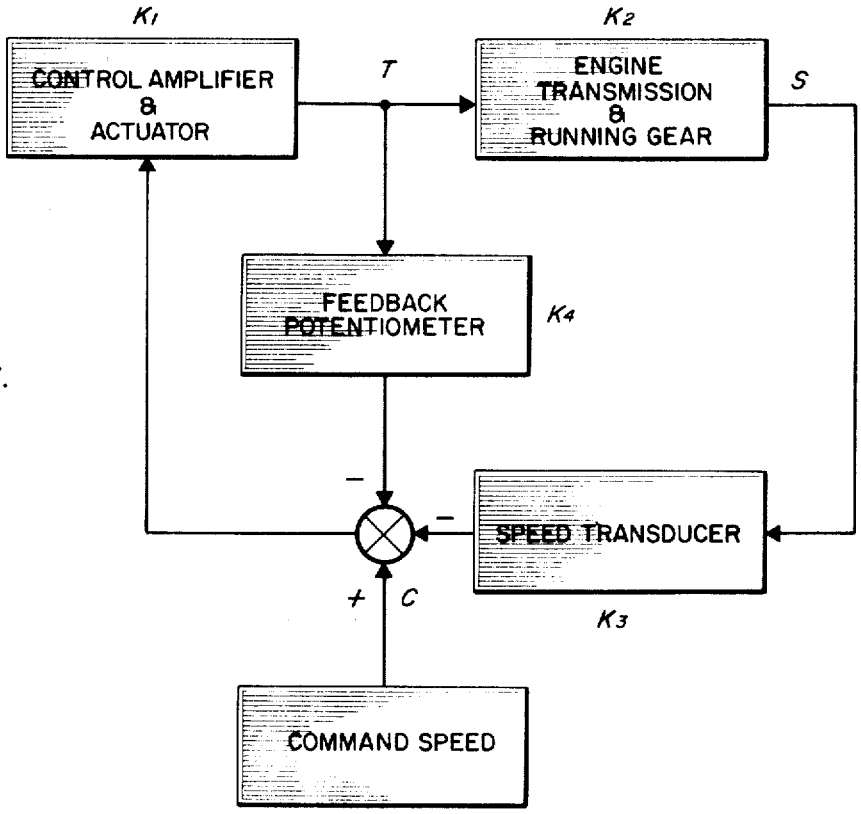
FIG. 3 is a functional block diagram of the invention showing the closed control loops.

FIG. 2 illustrates the construction of the control amplifier 17. The generator 16 may suitably be a variable reluctance alternating current type providing a signal having a frequency varying directly as the rotor speed and consequently as the vehicle road speed. A limiter transistor 41, normally biased into saturation by resistor 42, received the output of generator 16 through a temperature compensating diode 43. Negative half cycles of the output of generator 16 bias transistor 41 non-conductive. The output of transistor 41 therefore consists of positive pulses of fixed amplitude with a frequency proportional to vehicle road speed. These speed pulses are applied to a counter circuit of the energy storage type comprising capacitors 44 and 45 and diodes 46 and 47. Speed set potentiometer 18, connected through resistor 48 to the regulated A+ line 49 and through resistors 51 and 52 to ground, supplies a positive voltage to capacitor 45 through resistor 54. The higher speed settings of potentiometer 18 are towards the grounded end of the potentiometer so that an increased speed command reduces the magnitude of the command voltage on capacitor 45. Positive pulses from limiter 41 occur in proportion to the vehicle speed and are accumulated in capacitor 45 to a level which is proportional to the pulse frequency. The combined voltage on capacitor 45 is therefore in the form of a constant voltage minus a voltage proportional to command speed plus a voltage proportional to vehicle speed. This combined voltage appears on the base of a transistor 53 forming one-half of a differential amplifier 54. Transistor 55 forms the other half of amplifier 54. The input to transistor 55 is from the throttle position feedback potentiometer 19 which is connected through resistor 56 to the regulated A+ line and through resistor 57 to ground. Potentiometer 19 is phased so that opening the throttle causes the potentiometer arm to move towards the ground side, reducing the magnitude of the voltage input to transistor 55. The outputs of amplifier 54 appears across the collector load resistors 58 and 59 in opposite senses. For example, if the input voltage to transistor 55 is greater than the input voltage to transistor 53, the output voltage across resistor 59 will be reduced while the output across resistor 58 is increased. If the input to transistor 53 is the greater, the output voltage across resistor 58 is reduced and that across resistor 59 is increased. Both outputs are proportional to the difference between the inputs.

The outputs of amplifier 54 control a differentially connected driver amplifier 62 which includes transistors 63 and 64. Windings 21 and 22 of the modulator valve 23 load transistors 63 and 64. Power to amplifier 62 is supplied from an unregulated A+ line 65. Amplifier 62 operates similarly to amplifier 54, providing currents in windings 21 and 22 of opposite sense and in proportion to the difference between the output voltages of amplifier 54. When the input voltages to amplifier 54 are equal, equal output voltages appear across resistors 58 and 59. Transistors 63 and 64 conduct equally and the forces exerted by windings 21 and 22 on valves 24 and 25 are opposed and balanced. If the vehicle speed falls below the command speed, the input voltage to transistor 53 decreases. This results in increased output across resistor 58 and decreased output across resistor 59. These changes cause transistor 64 to conduct an increased amount of current through winding 22 and transistor 63 to conduct a reduced amount of current through winding 21. Valve 25 opens as a result of the unbalanced forces from windings 21 and 22, causing the pressure within the valve to be reduced and the actuator 31 (FIG. 1) to increase the throttle opening. As the vehicle speed increases, the output of the counter circuit increases and hence the input to transistor 53 increases. When the proper vehicle speed is reached, the inputs to transistors 53 and 55 are equal, the currents in windings 21 and 22 are balanced and both valves 24 and 25 are closed.

The safety features of the control include positive deactivation upon application of the vehicle brakes or opening of the ignition switch and the requirement that the vehicle be accelerated under manual control to a speed reasonably close to the command speed before the control can be actuated. These features are accomplished in the logic portion of the circuit, now to be described.

Power is supplied to the control amplifier 17 from the automobile battery 71, through fuse 72 and the normally open contacts 73 of an electromagnetically latched switch 74 to the unregulated A+ line 65. The regulated A+ line is supplied by a Zener diode 75 connected through an isolating resistor 76 to the unregulated line 65. Switch 74 is spring biased to the open position. When the contacts 73 are manually closed they will be held in the closed position by an armature 77, providing the winding of switch 74 is energized. A double pole switch 80, spring biased to the position shown, is mechanically coupled to switch 74 so that upon manually actuating switch 80, the contacts of that switch first change position then the contacts of switch 74 close. Switch 80 returns to the position shown upon release of manual pressure, but contacts 73 remain closed providing the winding of switch 74 is energized. The armature 77 of switch 74 is also coupled to a vacuum dump valve 81 in the actuator supply line 29 (FIG. 1) to hold that valve closed whenever switch 74 is closed. Opening switch 74 also opens dump valve 81 and prevents the application of vacuum to the actuator 31.

The winding of switch 74 is connected to the battery through the ignition switch 82 and to ground through a logic transistor 83 and the vehicle brake lights 84. Before the winding can be energized, switch 82 must be closed and transistor 83 must be conductive. Conduction of transistor 83 is controlled by the base bias derived from the collector of transistor 64, through an isolating diode 85 and resistor 86 or from contact 87 on switch 90. When the vehicle road speed is greater than the command speed, the input to transistor 53 is greater than the input to transistor 55 with the result that the conduction of transistor 64 is reduced and its collector voltage is increased over the value it assumes when no speed error exists. If the collector voltage is sufficiently positive, a voltage adequate to cause transistor 83 to conduct will present on its base and the winding of switch 74 will be energized. The amount of overspeed necessary for this to occur is dependent upon the values of resistors 86, 88 and 89, which are connected as a voltage divider.

With the winding of switch 74 energized, contacts 73 will be held closed and will supply battery voltage through arm 91 and contact 87 of switch 80 to the base of transistor 83. This holds transistor 83 conductive and frees the collector of transistor 64 to assume any value demanded by the system without causing transistor 83 to become non-conductive.

Switch arm 92 and contacts 93 and 94 are provided to eliminate undesired transients upon system actuation and to permit the system to lock in at a road speed slightly below the command speed. When switch 80 is actuated, power is applied as a surge to the control amplifier, dump valve 81 is closed and it is uncertain initially what pressure variations may occur in modulator valve 23 before the amplifier stabilizes. To insure that these variations are not communicated to the throttle, winding 21 of valve 23 is grounded through resistor 95, contact 94 and switch arm 92 as long as switch 80 is held in the actuate position. Current in winding 21 is then heavy, causing valve 24 to open and prevent the application of vacuum to the actuator 31. Upon release, switch arm 92 returns to contact 93 and amplifier 62 is in normal control of valve 23. Contact 93 is connected to resistor 52 which is in shunt with resistor 51. When switch 80 is actuated the circuit through resistor 52 is opened with the effect that the voltage at the arm of potentiometer 18 is increased. It will be recalled that an increase in potentiometer voltage is equivalent to a reduction in command speed. Therefore if the vehicle is traveling at or slightly below the command speed when switch 80 is actuated, the temporary reduction in command speed effected by opening contact 93 produces the overspeed condition in transistor 64 necessary for system lock in. Upon release of switch 80 the command speed is returned to its selected value and the locked in control will accelerate the vehicle, if necessary, to the proper road speed.

The emitter of transistor 83 is grounded through the vehicle brake lights 84. If the brakes are applied, full battery voltage is applied through the brake switch 96 to the brake light. The emitter of transistor 83 is then raised to the battery voltage and the transistor becomes non-conductive. The winding of switch 74 is deenergized and the system completely releases any control of the engine throttle. When the way is clear to resume speed it is necessary again to manually actuate switch 80 before the system will assume control of the vehicle speed.

A second vacuum dump valve 97 (FIG. 1) may be mechanically or electrically operated from the brake pedal to insure that the system will release control upon application of the brakes. On vehicles equipped with manual transmissions, valve 97 may also be linked to the engine clutch release to cause the system to release control whenever the engine is declutched. The system will not then cause the engine to race during gear changing and once the clutch is re-engaged vacuum is restored to the system. Operation of valve 97 along does not deenergize switch 74, so that the system is not deactivated after a change in gears, but assumes control in the new gear upon re-engagement of the clutch.

The system has been described as if all its elements were linear, and the parameters were constant. No particular regard has been paid to the dynamics of the system. On modern well graded highways sudden changes in engine load are seldom encountered. A "tight" control system, i.e. one with high open loop gain, is not necessary for satisfactory performance. In fact, tight control systems not only are more difficult to stabilize than "loose" systems, but they waste considerable fuel through the action of the accelerating pump conventionally included in the engine carburetor. A part from the dynamics of the system, consideration must be given to the engine performance in order that the system error in the steady state can be assessed.

Figure 4:
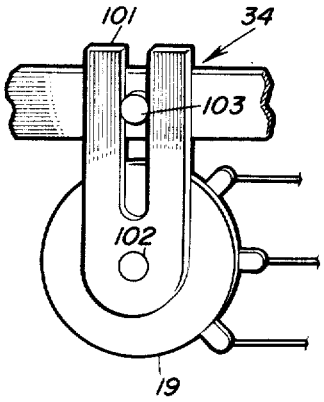
FIG. 4 illustrates details of the linkage of the feedback potentiometer to the actuator arm.

In FIG. 4, the elements of the system show the arrangement typical of a closed loop servo system. Gain factors $K_1$, $K_2$, $K_3$ and $K_4$ have been assigned to the elements. It is implied that these factors include proper conversions for dimensions so that the output of any element is obtained by multiplying the numerical value of the input by the element gain. For example, 0.1 v. input to the control amplifier and actuator might produce 10° opening of the throttle. The value of $K_1$ would then be 100/v. Similarly, 10° throttle opening might produce 20 m.p.h. of vehicle speed. The value of $K_2$ would be 2 m.p.h./°. The steady state transfer function for the system can be written in the following form:

$$S/C=\frac{K_1 K_2}{1+K_1 K_4+K_1 K_2 K_3}$$

where:

S=vehicle road speed
C=command speed
$K_1$=gain of control amplifier and actuator
$K_2$=gain of engine, transmission, and runing gear
$K_3$=gain of speed transducer
$K_4$=gain of feedback potentiometer.

As the vehicle road speed increases wind and friction losses increase, and further, the engine torque output reaches a peak and commences to diminish. As a result, $K_2$ cannot be considered constant throughout the speed range of the vehicle, but rather its value is significantly less at higher speeds and heavier engine loads than at lower speeds and lighter engine loads. The effect of such a change in $K_2$ is to increase markedly the system error at low values of $K_2$. It is evident from the steady state transfer function that as $K_2$ is reduced, with the other factors held constant, S/C, is reduced. It is also evident from the transfer function that if at the time $K_2$ is reduced $K_4$ is reduced in proper proportion, all other factors being constant, S/C can be held constant. The proper reduction in $K_4$ can be shown readily by finding the principal part of the increment in S/C with changes in $K_2$ and $K_4$ and equating the increment to zero. That is, $$\Delta S/C=\frac{\partial S/C}{\partial K_2}\Delta K_2+\frac{\partial S/C}{\partial K_4}\Delta K_4=0$$

when this operation is preformed it is found that $$(K_1+K_1^2K_4)\Delta K_2=K_1^2K_2\Delta K_4$$

The following arbitrary set of figures will illustrate:

| Low speed: | High speed |
|---|---|
| $K_1$=10° throttle/volt | 10° throttle/volt. |
| $K_2$=10 m.p.h./° throttle | 5 m.p.h./° throttle. |
| $K_3$=0.1 v./m.p.h. | 0.1 v./m.p.h. |
| $K_4$=1.0 v./° throttle | 1.0 v./° throttle. |

Using these figures, the low speed value of S/C is 4.75 and the high speed value of S/C is 3.12. Solving for $\Delta K_4$ using the low speed figures and $\Delta K_2=-5$, $\Delta K_4$ is found to be −.55. If the high seed figures are changed so that $K_4$ becomes 0.45, the high speed value of S/C equals 4.75, the same as at low speed.

The throttle displacement is a good means of gauging the engine load. If the throttle opening is wide, either the command speed is high or the engine is laboring under more than average load. In either event it is certain that the engine gain has decreased and it is appropriate to change the gain of the feedback potentiometer. FIG. 4 illustrates the means for changing the gain of the feedback potentiometer as a function of the throttle displacement. The linkage 34, previously mentioned, comprises a slotted crank arm 101 clamped to the rotatable shaft 102 of potentiometer 19. The body of potentiometer 19 is fixed against rotation. A pin 103 fixed to the output of actuator 31 travels in the slot of crank arm 101. When the displacement of actuator 31 is small, the effective length of crank arm 101 is at its smallest value. Consequently an incremental change in the actuator displacement then produces the greatest increment in the rotation of potentiometer shaft 102. When the displacement of the actuator is large, the effective length of crank arm 101 is increased and the incremental change in rotation of shaft 102 with actuator displacement is reduced. The gain of the feed-back potentiometer 19 is thus made to vary as a function of the actuator displacement, the greatest feedback gain being obtained at the smallest actuator displacement. Properly dimensioned, the linkage 34 nicely compensates for loss of engine gain by reducing the feedback gain and thereby maintains the system error substantially constant throughout its range of operation.

Obviously many modifications and variations of the present invention are possible in the light of the above teachings. It is therefore to be understood that, within the scope of the appended claims, the invention may be practiced otherwise than as specifically disclosed.

The invention chaimed is:

1. A speed control system for an automobile having throttle regulated propulsive means and brakes, comprising means providing a first electrical signal corresponding to the desired automobile speed, means providing a second electrical signal corresponding to the actual vehicle speed, means providing a third electrical signal corresponding to the position of the throttle of said propulsion means, means combining said first, second and third signals to provide an error signal, a pressure fluid source, a pressure fluid actuator for positioning said throttle proportionately to the pressure of fluid applied thereto, a pressure control valve having a sealed chamber, first valve means for controlling the admission of fluid under pressure to said chamber and second valve means for controlling the exhaustion of fluid from said chamber, a conduit connecting the chamber of said control valve to said actuator, and amplifying means controlling said first and second valve means to either admit fluid under pressure to said control valve chamber or to exhaust fluid from said chamber depending upon the sense of said error signal and in proportion to the magnitude of said error signal.

2. A speed control system as claimed in claim 1 wherein said pressure fluid is air at atmospheric pressure.

3. A speed control system as claimed in claim 1 with additionally switch means controlling the application of power to said amplifying means, and logic means responsive to the sense of said error signal and arranged to maintain said switch means in position to supply power continuously to said amplifying means once the sense of said error signal corresponds to an automobile speed in excess of a desired speed.

4. A speed control system as claimed in claim 3 with additionally, means for disabling said logic means to cause removal of power from said amplifying means upon the application of the automobile brakes.

5. A speed control system as claimed in claim 1 wherein said means providing a third electrical signal comprises a potentiometer having a moveable element coupled to said throttle, together with means for reducing the proportionality of potentiometer signal output to throttle position as the throttle moves toward a position of greater output from said propulsion means.

6. A speed control as claimed in claim 5 wherein said means providing a first electrical signal comprises an alternating current generator, means for driving said generator proportionately to the wheel speed of said automobile, and a counter circuit producing a direct current proportional to the frequency of the output of said generator.

7. A speed control system for an automobile powered by a throttle controlled engine comprising:

means providing a first electrical signal corresponding to the desired road speed of the automobile;

means providing a first electrical feedback signal corresponding to the actual road speed of the automobile;

means providing a second electrical feedback signal corresponding to the position of the engine throttle;

means providing an error signal comprised of the difference between said first signal and the sum of said first and second feedback signals;

a vacuum source;

a vacuum modulator valve including a chamber, first electromagnetic valve means for admitting air from the atmosphere to said chamber and second electromagnetic valve means controlling flow from said chamber to said source, said first and second valve means opening alternatively according to the direction of applied electrical currents and in proportion to the magnitude of the applied currents;

a vacuum actuator having a sealed expansible chamber connected to the chamber of said modulator valve and linked to said engine throttle for opening said throttle in proportion to the sub-atmospheric pressure of said modulator valve chamber; and means for amplifying said error signal for supplying currents to said first and second valve means of said modulator valve of direction dependent upon the sense of said error signal and of magnitude proportional to the magnitude of said error signal.

8. A speed control system as claimed in claim 7 with additionally a manually operable switch for applying power to said amplifying means;

an electromagnet for holding said switch in position to continuously supply power to said amplifying means when said electromagnet is energized; and a logic circuit through which current is supplied to energize said electromagnet, said logic circuit being conductive whenever said error signal is of a sense corresponding to an actual road speed in excess of a desired road speed.

9. A speed control system as claimed in claim 8 with additionally, means for rendering said logic circuit non-conductive upon application of the automobile brakes; and means for venting the chamber of said modulator valve to the atmosphere upon application of the automobile brakes.

10. A speed control system as claimed in claim 7 wherein said means providing a second electrical feedback signal comprises:

a potentiometer having a moveable member; and means linking said moveable member to said actuator, said potentiometer providing an output variably proportioned to the position of the engine throttle, the proportionality of output to throttle position being reduced as the throttle position moves towards increased engine output.

*11. A speed control system for an automobile having throttle regulated propulsive means and brakes, comprising*

*means providing a first electrical signal corresponding to the desired automobile speed,*

*means providing a second electrical signal corresponding to the actual automobile speed,*

*means providing a third electrical signal corresponding to the position of the throttle of said propulsion means,*

*means combining said first, second and third signals to provide an error signal,*

*a pressure fluid source, and pressure fluid means communicating with said pressure fluid source for positioning said throttle proportionately to the fluid pressure therein and including means responsive to said error signal for varying the fluid pressure therein.*

References Cited

The following references, cited by the Examiner, are of record in the patented file of this patent or the original patent.

UNITED STATES PATENTS

| | | | |
|---|---|---|---|
| 3,070,185 | 12/1962 | Fales | 180—108 |
| 3,333,463 | 8/1967 | Hollinghurst | 123—102 X |

A. HARRY LEVY, Primary Examiner

U.S. Cl. X.R.

123—102